Feb. 3, 1942.  E. P. KINNE  2,271,770
COUPLER
Filed Oct. 20, 1939   8 Sheets-Sheet 1

INVENTOR.
Edmund P. Kinne,
BY
ATTORNEY.

Feb. 3, 1942. E. P. KINNE 2,271,770
COUPLER
Filed Oct. 20, 1939 8 Sheets-Sheet 3

INVENTOR.
Edmund P. Kinne,
BY
ATTORNEY.

Feb. 3, 1942.  E. P. KINNE  2,271,770
COUPLER
Filed Oct. 20, 1939  8 Sheets-Sheet 4

INVENTOR.
Edmund P. Kinne,
BY
ATTORNEY.

Feb. 3, 1942. E. P. KINNE 2,271,770
COUPLER
Filed Oct. 20, 1939 8 Sheets-Sheet 5

INVENTOR.
Edmund P. Kinne,
BY
ATTORNEY.

Feb. 3, 1942. E. P. KINNE 2,271,770
COUPLER
Filed Oct. 20, 1939 8 Sheets-Sheet 6

INVENTOR.
Edmund P. Kinne,
BY
ATTORNEY.

Feb. 3, 1942.  E. P. KINNE  2,271,770
COUPLER
Filed Oct. 20, 1939  8 Sheets-Sheet 7

INVENTOR.
Edmund P Kinne,
BY
ATTORNEY.

Feb. 3, 1942. E. P. KINNE 2,271,770
COUPLER
Filed Oct. 20, 1939 8 Sheets-Sheet 8

INVENTOR.
Edmund P. Kinne,
BY
ATTORNEY.

Patented Feb. 3, 1942

2,271,770

UNITED STATES PATENT OFFICE 2,271,770

COUPLER

Edmund P. Kinne, Alliance, Ohio, assignor to American Steel Foundries, Chicago, Ill., a corporation of New Jersey Application October 20, 1939, Serial No. 300,307

35 Claims. (Cl. 213—104)

My invention relates to car couplers of the automatic type, and is especially adaptable for use on mine or industrial cars where it is desired to couple either end of one car to either end of another car.

An object of my invention is to devise such couplers of rigid or tight lock type which are free of slack and when coupled are nonarticulating at the point of coupling.

A different object is to provide such a coupler as that described which will function automatically within a wide range of angling, both horizontal and vertical, without the necessity of manual adjustment therefor.

My invention contemplates an arrangement which will function with the efficiency and safety required in modern operating conditions on American railways and includes a lock-set which affords means for holding the lock in unlocked position so that uncoupling may take place without requiring the operator to hold the lock in an unlocked position; and also contemplates such an arrangement with means acting automatically to prevent accidental uncoupling due to creeping or jarring of the lock, thus affording what is sometimes called a lock-to-the-lock, preventing movement of the lock until released by normal action.

My novel form of coupler provides also an automatic release from the described lock-set position as well as from the lock-to-the-lock arrangement.

My novel form of coupling is of such design as to present coupling faces ready for coupling under all conditions requiring no preliminary action on the part of an operator such as is often required with couplers of the more common knuckle type wherein it is frequently necessary for one or both knuckles to be manually opened if they have been closed by accident or design.

My novel form of coupler affords a housing for the coupling and locking mechanism preventing interference therewith by accumulation of dirt or coal dust, such as might easily occur when the cars are overturned in a dumping operation or otherwise. The parts are thus also protected from accidental damage.

Another notable feature in my novel coupling device is a novel form of housing in which the metal is so disposed as to afford maximum strength for a given weight of metal.

My invention also comprehends an arrangement wherein locking means between mated couplers is afforded in the form of solid blocks interposed between portions of the housings and placed under compression to prevent separation of the couplers when a pulling load is applied thereto.

A different object of my invention is to provide a coupling device such as above described, wherein uncoupling may be accomplished by releasing the lock of either coupler.

In the drawings.

Figure 8 is a plan view of my novel form of spring socket; and,

Figure 8A is an end elevation thereof, and Figure 8B a side elevation.

Figure 9 is a side elevation, and Figure 9A a plan view of my novel form lock-to-the-lock cam.

Figure 13:
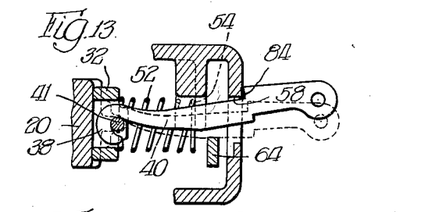
Figures 13 and 14 are sectional views therethrough taken respectively in the vertical planes indicated by the lines 13—13 and 14—14 of Figure 12.

Describing my novel structure in greater detail and referring more particularly to Figures 1 to 9 inclusive, it may be noted that the coupler generally indicated at 2 comprises the fragmentarily shown shank 3 and the head 4 in the form of a hollow box-like structure of funnel form presenting at the front face thereof the opening 6 extending halfway across said front face, and having the hollow nose 8 extending from the other half of said face, said nose 8 having tapering sides converging at the point 9. The said nose 8 is integrally formed with the housing 4 and is designed to be telescoped within the front opening 6 of a mated coupler as will hereafter become more apparent. The main body of the housing 4 terminates in the flange 10 which extends entirely around the perimeter thereof in a vertical plane, and the nose portion 8 extends outwardly therefrom, said nose portion having the top and bottom tapered surfaces 12 and 14 respectively (Figure 3) and the tapered sides 16 and 18, said tapered side 18 having a generally arcuate surface as contrasted with the flat surfaces 12, 14, and 16 of the other sides thereof. Housed within the nose 8 and projecting therefrom through the opening 21 is the lock 20 shown in detail in Figures 6, 6A, and 6B. The said lock is a solid block of metal with a pin opening 23 affording a convenient means of connection as at 22 with the pivot pin 24, the head of which is seated as at 26 (Figure 2) recessed in the top wall of the nose 8 and secured in position as by means of the cotter 28 at the lower end of said pin which is afforded a seat in the bottom wall of said nose. Adjacent its locking end, the lock 20 affords a seat as at 30, 30 for the spring socket 32, said spring socket having at opposite sides thereof, the lugs 34, 34 suitable for seating in the sockets 30, 30 formed on the lock. At a point intermediate the sockets 30, 30 is formed the eye 36 defined by the bridge 37, said eye affording a means of connection for the hook-line end 38 of the operating arm 40, said hook-like end extending through the slot 39 centrally formed in said spring socket 32, all of which is best shown at 41 in the sectional view of Figure 13. Said operating arm 40 has the form and detail shown in Figures 7 and 7A with a shoulder 42 on the top side thereof and a shoulder 44 on the bottom side thereof serving functions hereafter more particularly described, said operating arm also having at its outer end the eye 46 serving as a means of connection for any convenient form of handle. The spring socket 32 is afforded a bearing against vertical displacement by engagement of the bridge 37 within the slot or channel 48 formed on one face of said spring socket and on the opposite face of said socket the spaced lugs 50, 50 define a boss-like structure forming positioning means for the compression spring 52. The spring 52 surrounds the operating arm 40 and its opposite end is seated as at 54 around the box 56 on the lateral wall of the coupler head, as best seen in the sectional view of Figure 5. The operating arm 40 extends through the vertical slot 58 in the side wall of the coupler head, said slot having such dimensions as to afford vertical movement of said operating arm as best seen from a consideration of Figures 11, 13, 14, and 16.

Figure 9:
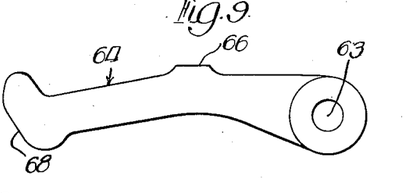
Figure 9A:
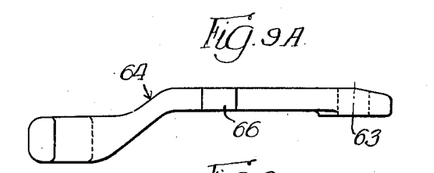

In the side wall of the coupler head adjacent the slot 58 may be pivotally secured as at 60 by means of a rivet 62 inserted through the hole 63, the cam member 64 shown in detail in Figures 9 and 9A, said cam member affording an abutment intermediate its ends against said operating arm 40 as at 66 (Figure 11) when said cam member is in its raised position and couplers are coupled. The movable end of the cam member 64 extends through the slot 67 in the bottom wall of the coupler head and is afforded a cam surface as at 68 for engagement as at 94 (Figure 15A) with the sloping surface provided at the mouth of the opening 6 on a mated coupler and for a purpose more clearly set forth hereafter.

Figure 10:
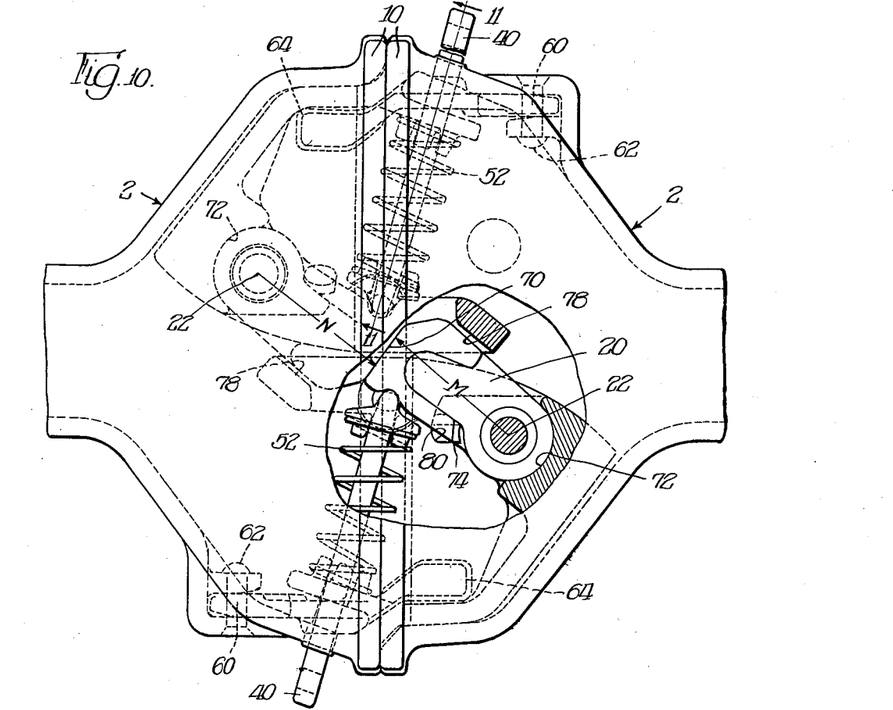
Figure 10 is a top plan view of mated couplers embodying my invention in normal coupled position with portions of the coupler heads cut away to show more clearly the locking arrangement.

Figure 10 shows mated coupler heads 2, 2 in locked coupled position. From a consideration of this figure, it may be noted that the locks of the mated couplers abut each other as at 70 along surfaces in the shape of shallow ogee curves, one portion of which is formed on the radius M from the pivot point 22 of one coupler, and the other portion of which is formed along a radius N from the pivot point 22 of the other coupler, thus enabling the locks to pass each other in the coupling or uncoupling operation as will become more apparent hereafter. The ogee form of the locking face is most clearly seen at 71 in Figure 6A. In the locked position, the two locks in abutment as aforesaid form substantially a straight column structure in compression as the couplers are placed under a pulling load. As said pull is applied, each lock seats as at 72 (Figure 10) against the lateral wall of the coupler head, thus preventing too great a shear stress upon the pivot pin. In the locked position, each lock is afforded a stop as at 74 by abutment of the flange 76 (Figure 6A) against the stop lug 77 (Figure 12) projecting upwardly from the bottom wall of the coupler head. A further stop is provided as at 78 against which the lock may seat in case of wear at the before mentioned stop 74. Clockwise rotation of the lock 20 is thus prevented. The lug 77 is relieved at the bearing point 74 by the opening 80 in the bottom wall of the coupler head, thus permitting any dirt or other extraneous matter to escape and avoiding fouling of the locking mechanism. With the couplers in locked position as in Figure 10, it may be noted that the flanges 10, 10 are in full abutment, that the compression springs 52, 52 are urging the locks into tight engagement with each other and against the stops at 74, 74, also that each operating arm 40 affords a lock-to-the-lock as at 82 (Figure 11) by the shoulder 44 which may engage the cam member 64 except when the operating arm 40 is raised in the uncoupling operation.

Figure 1:
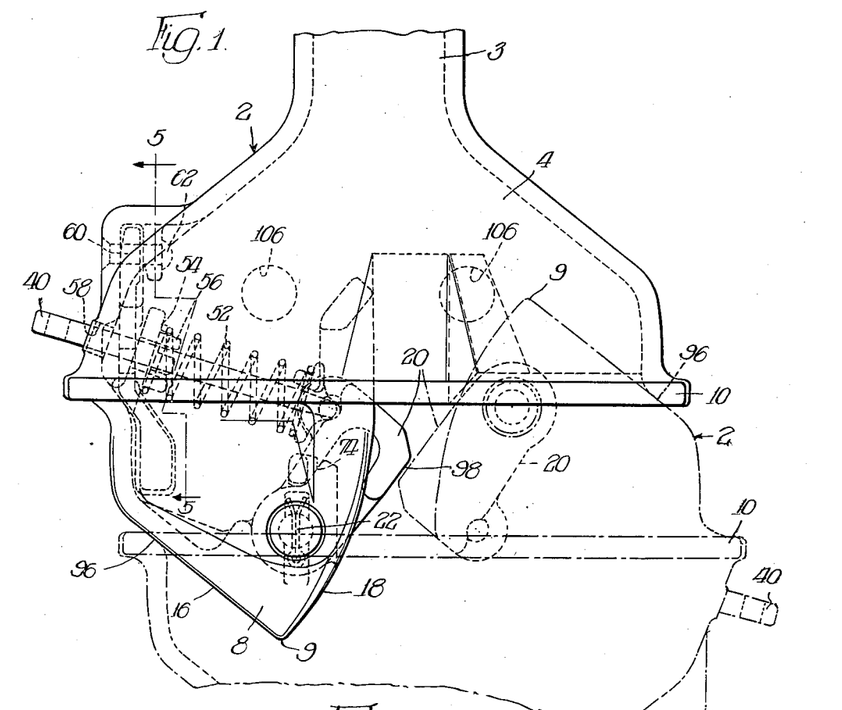
Figure 1 is a top plan view of a coupler embodying my invention and shows also in phantom outline a fragmentary portion of a mating coupler.
Figure 2:
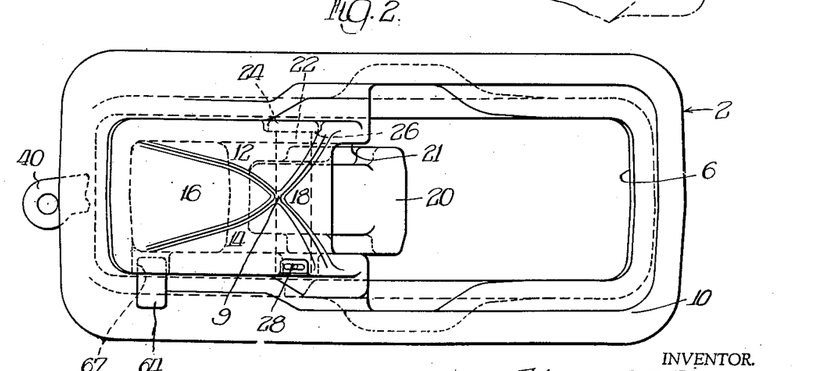
Figure 2 is an end view taken from the open end of the coupler structure shown in Figure 1.
Figure 5:
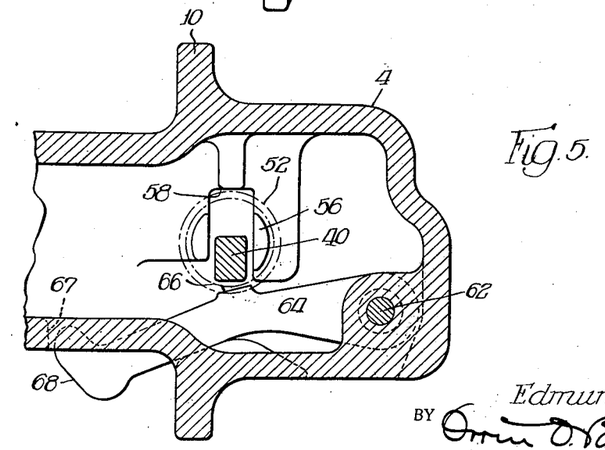
Figure 5 is a sectional view taken in the vertical plane substantially as indicated by the line 5—5 of Figure 1.
Figures 6, 6A, 6B, 7A:
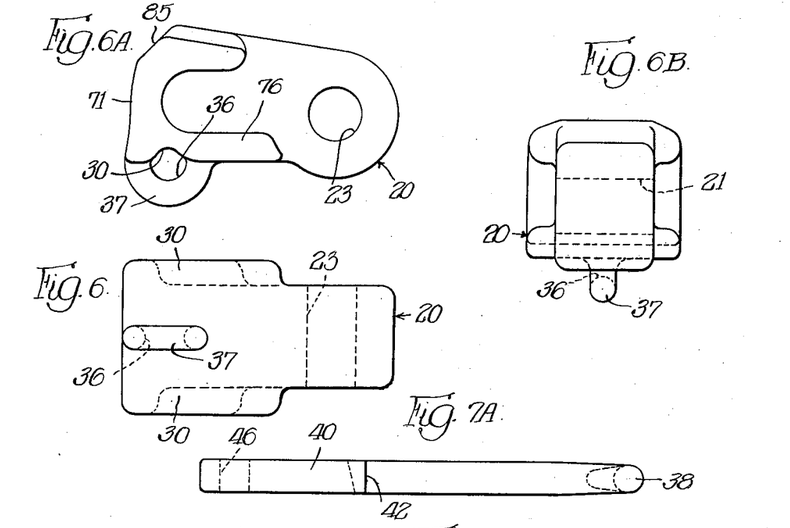
Figure 6 is a side elevation of my novel form of lock, the view being taken from the bottom as seen in Figure 6A.
Figure 6A is a top plan view of my novel form of lock.
Figure 6B is an end elevation thereof taken from the right as seen in Figure 6A.
Figure 7A is a top plan view thereof.
Figure 7:
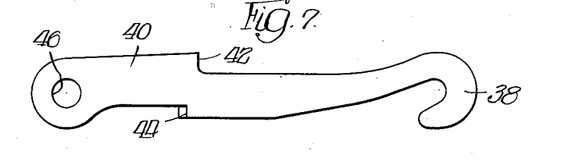
Figure 7 is a side elevation of my novel form of operating arm.
Figures 8, 8B:
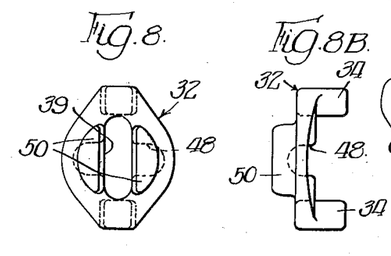
Figure 12:
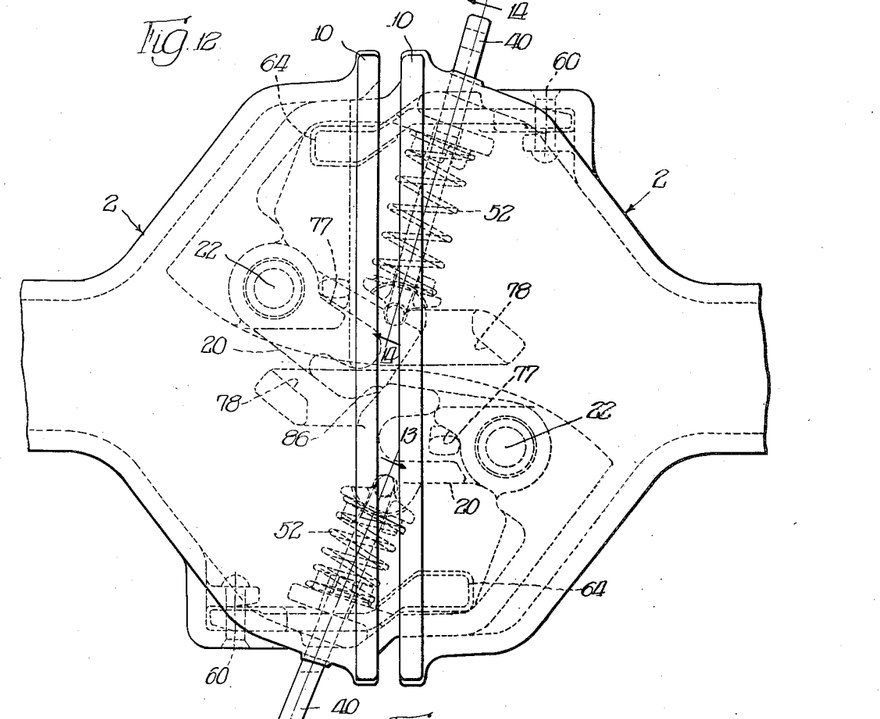
Figure 12 is a top plan view of couplers embodying my invention in the initial stages of the uncoupling operation.
Figure 12A:
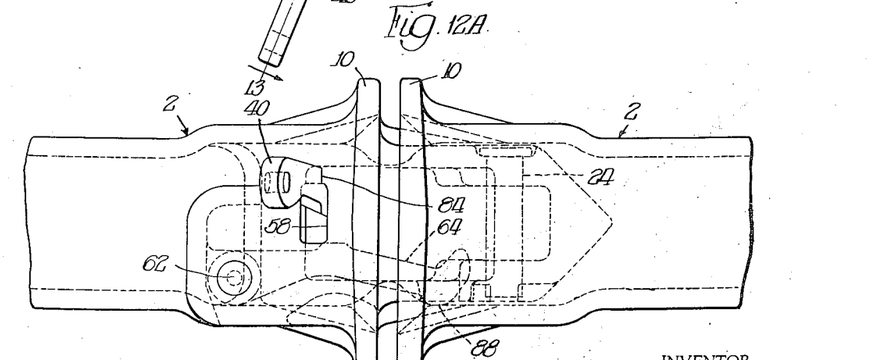
Figure 12A is a side elevation view of the coupler structure shown in Figure 12.

In the uncoupling operation, the operating rod 40 may be grasped and pulled outwardly (Figure 12 left), and the shoulder 42 of the operating rod may be seated against the lip 84 formed at the top of the opening 58, thus providing a lock-set. As the operating arm 40 is withdrawn, the spring 52 is compressed and the lock 20 to which the hook-like end of the operating arm is connected as previously described is rotated in a counter-clockwise direction to the position shown in Figure 12 where the tapered surface 85 thereof may engage as at 86 the lock of the mated coupler. As shown in Figure 12, the couplers have been partially separated, but the cam member 64 of the coupler at the right is still in its raised position as seen in the sectional view of Figure 14 so that the lock-to-the-lock or anti-creep thereof is operative because the shoulder 44 of the operating arm 40 is in abutment as at 82 against the cam member 64 and the cam member 64 is held in its uppermost position as long as it is seated as at 88 (Figure 12A) upon the horizontal portion of the bottom wall of the mating coupler. In the further separation of the couplers, the engagement of the locks at 86 will cause the lock-set lock of the coupler at the left to be further rotated in a counterclockwise direction, thus releasing the lock-set at 84 (Figure 13) and permitting the operating arm 40 to drop first into the position shown in dotted lines in Figure 13 and then to return to normal position as seen in Figure 2, wherein the operating arm 40 is resting on the bottom of the slot 58 and the cam member 64 is riding on the bottom wall of the coupler head (Figure 5).

Figure 10A:
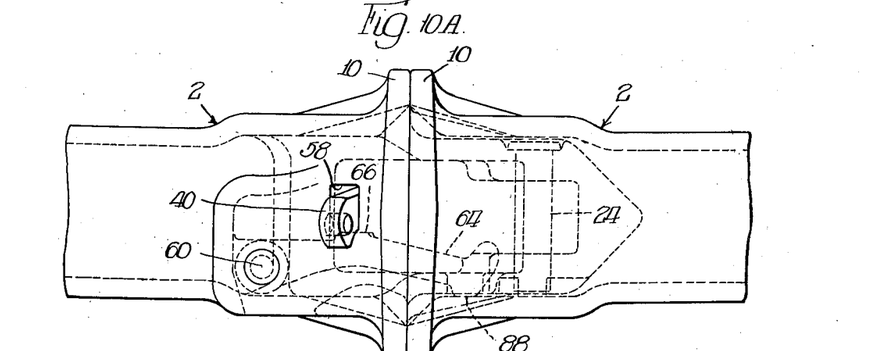
Figure 10A is a side elevation thereof taken from the bottom as seen in Figure 10.
Figure 11:
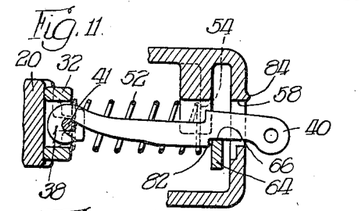
Figure 11 is a sectional view through the coupled structure taken substantially in the vertical plane indicated by the line 11—11 of Figure 10.
Figures 14, 16, 17:
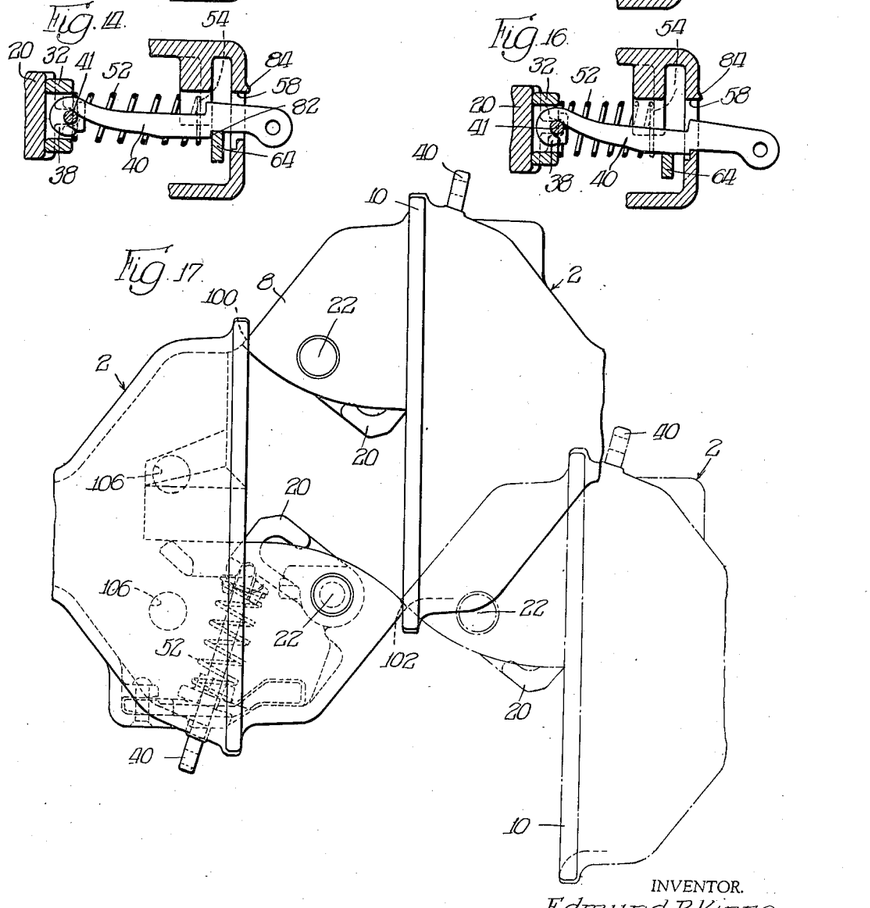
Figure 16 is a sectional view taken substantially in the vertical plane indicated by the line 16—16 of Figure 15.
Figure 17 is a composite view showing in full lines two couplers coupling under maximum lateral offset conditions; in phantom lines one of said couplers is shown in the maximum lateral offset conditions in the opposite direction.
Figure 15:
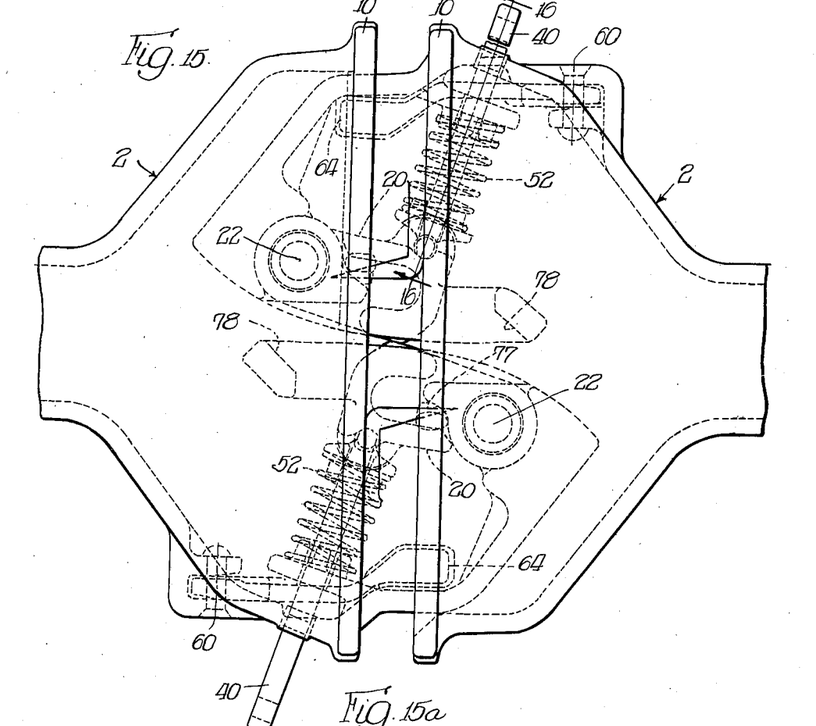
Figure 15 shows a somewhat later stage of the uncoupling operation.
Figure 15A:
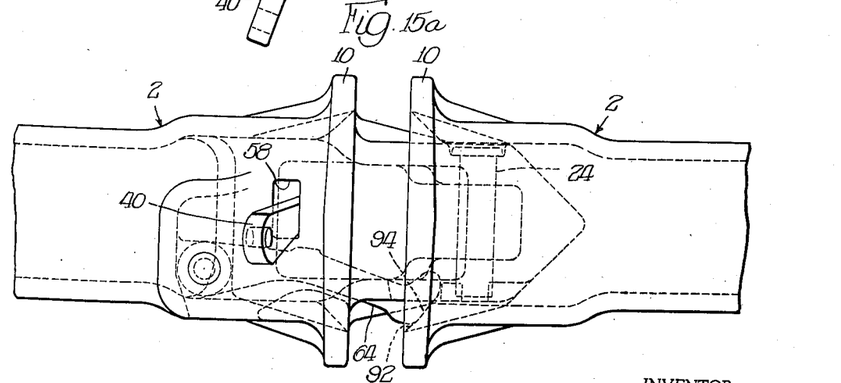
Figure 15A is a side elevation thereof taken from the bottom as viewed in Figure 15.

In thus separating the couplers to the positions shown in Figures 15 and 15A, the tapered end 68 of the cam member 64 may slide down the inclined surface 92 at the open end of the mating coupler as best seen at 94 (Figure 15A), thus releasing it from engagement with the operating arm as already described. In the reverse operation, that is, when the couplers are moving toward each other, the cam member 64 engages and moves up the incline 92 assuming the coupled position already referred to as in Figure 10A wherein a portion of the cam 64 lies behind the anti-creep shoulder 44 of the operating arm as already indicated and as seen at 82 (Figure 11) and wherein also the raised position of the cam 64 brings the seat 66 thereof (Figure 5) into engagement with the operating arm 40, thus raising the said arm slightly and bringing the parts to the relative positions best shown in Figure 14.

Referring again to Figure 1, an opposing coupler 2 is shown in phantom lines in one position assumed in coupling wherein the two couplers are moving toward each other. The nose of each coupler is engaging the opposing coupler as at 96. At this instance, the lock 20 of each coupler is in its normal position, projecting slightly beyond the center line of the coupler, and the two locks of the opposing couplers are about to engage each other as at 98. Each lock is free to rotate in a counterclockwise direction, and further movement of the couplers toward coupled position will permit the two locks to slip past each other and assume the locked position shown in Figure 10 as already described.

Figure 3:
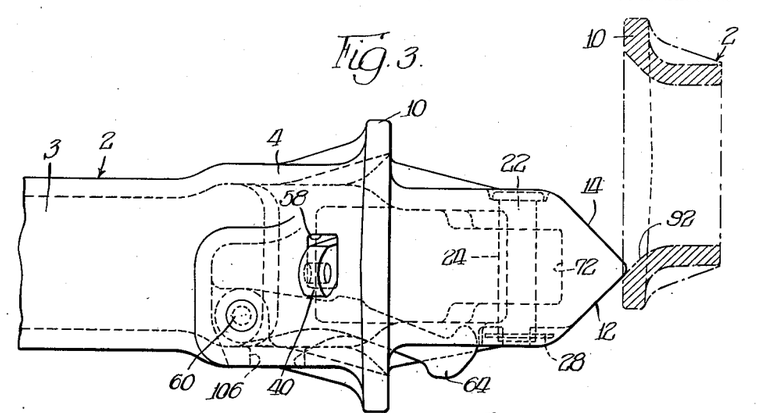
Figure 3 is a side elevation of the structure shown in Figures 1 and 2 as taken from the left thereof, and includes a fragmentary sectional view through the open end of a mating coupler.
Figure 4:
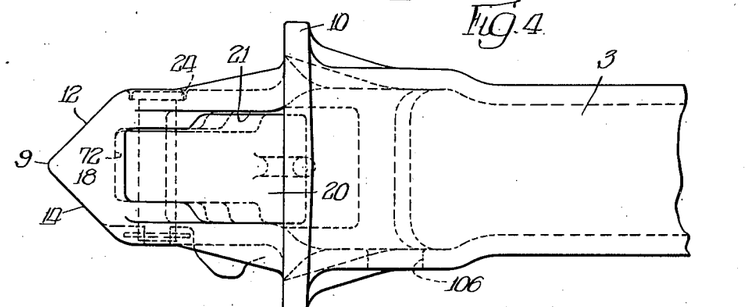
Figure 4 is a side elevation of the coupler structure shown in Figures 1 and 2 as taken from the right of those figures.

In Figure 3 is shown, in partial section, a condition sometimes encountered wherein two couplers are offset vertically with respect to each other. Under such conditions, the tapered surface 12 on the nose of one coupler is slid up the incline at 92 on the open end of the opposing coupler, thus pulling the two coupler heads into alignment with each other to permit completion of the coupling operation.

Figure 18:
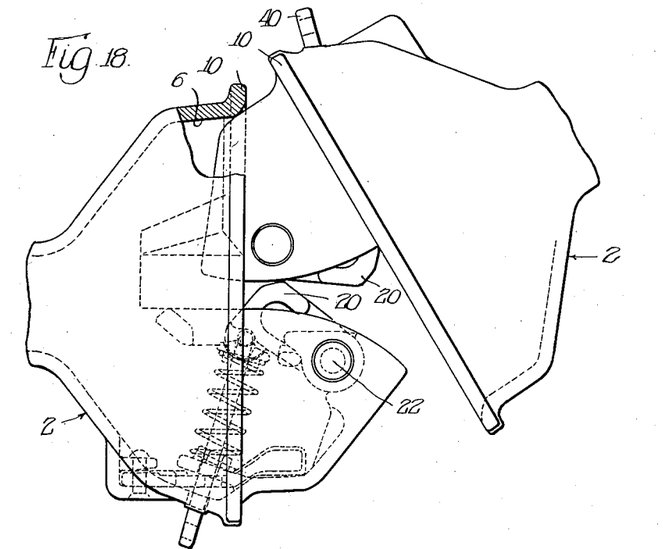
Figure 18 shows two couplers coupling under conditions of lateral angling.
Figure 19:
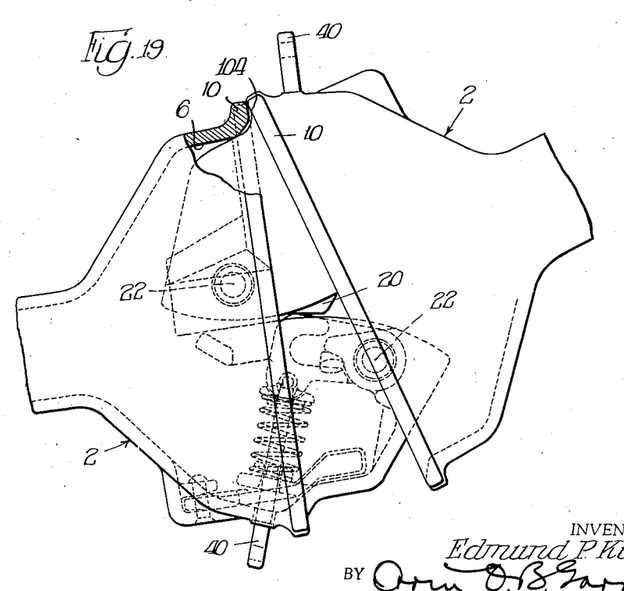
Figure 19 shows two couplers coupling under another condition of lateral angling.

Figure 17 shows the normal lateral gathering range of my novel form of coupler. In the one case as shown, the nose 8 of the coupler at the right is engaging as at 100 the open end of the coupler at the left and thus entering the funnel-shaped opening 6. In the other case shown, the coupler at the right is indicated at phantom lines and is positioned the maximum amount in the opposite direction within the gathering range so that the noses of the opposing couplers are engaging as at 102 in a manner which will cause the two couplers to assume the position shown in Figure 18 wherein the heads of the two couplers are drawn together laterally, and the nose of the coupler at the right is already entering the opening 6 of the mating coupler and is engaging the lock 20 thereof as the coupler heads are brought further into line. Further movement toward each other will cause the couplers to assume the position shown in Figure 19 wherein the flanges 10, 10 having engaged each other as at 104, the locks both rotated inwardly in a counterclockwise direction, and the coupler heads have been drawn further in line with each other. As the movement continues, it will readily be seen that the heads will be pulled completely into line through pressure at the point 104 resulting in the final coupled position shown in Figure 10.

The bottom wall of each coupler head is cored out as at 106, 106 for the purpose of drainage and to facilitate the escape of dirt or other extraneous matters such as coal dust which might accumulate therein.

It will be noted by those skilled in the art that I have thus provided an automatic car coupler particularly suitable for use on mine or industrial cars, and of a tight lock type wherein the couplers are maintained rigidly in line with each other as at coupling and wherein uncoupling may be accomplished by releasing the lock of either coupler. Furthermore, my novel arrangement affords the safety of a lock-to-the-lock or anti-creep feature as well as a lock-set arrangement which permits the couplers to be set for separation at any point without requiring an operator to be present at the time the cars are pulled apart. My novel coupler further provides automatic release from the lock-set position so that as at coupling, each coupler is always ready for the succeeding coupling operation without further preparation on the part of an operator. Moreover, the operating parts are housed in the coupler head and thus protected from accumulation of dirt and other matters such as might interfere with normal operation. In addition, a relatively wide gathering range is afforded, both vertically and laterally, thus reducing to a minimum the requirements of manual operation.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In an automatic coupling, mated coupler heads, each comprising a housing presenting adjacent its forward end a peripheral flange for abutment with the mating coupler, a tapering nose projecting beyond said flange, an opening adjacent said nose for reception of the nose of the mating coupler, locks pivoted adjacent the forward ends of said noses with locking faces in engagement with each other at ends remote from said pivots when said couplers are in normal pulling position, resilient means retaining said locks in normal locked position, an operating arm connected to each of said locks for manual movement of said lock, a cam member pivoted at one end in each of said coupler heads with anti-creep means engaging means on the adjacent operating arm, said cam member being retained in normal locked position by engagement with the opposing coupler, said operating arm being operable to rotate the associated lock to lock-set position wherein said lock-set lock may be slidably engaged by the lock of the mated coupler as said couplers are uncoupled for release of said lock-set.

2. In an automatic coupling, mated coupler heads, each in the form of a housing presenting adjacent its forward end a peripheral flange for abutment with the mating coupler, a tapering nose projecting beyond said flange, an opening adjacent said nose for reception of the tapered nose of the mating coupler, locks pivoted adjacent the forward ends of said noses and having locking faces in engagement with each other when said couplers are in normal pulling position, resilient means retaining said locks in normal locked position, an operating arm pivoted to each of said locks and extending through said resilient means and outwardly of the coupler head for manual movement of said lock, and a cam member pivoted in each of said coupler heads and having anticreep means engaging means on the associated operating arm, said cam member being retained in normal locked position by engagement with the opposing coupler.

3. In a tight lock automatic vehicle coupling, mated coupler heads each comprising a funnel-shaped housing having a tapering nose and an opening for reception of the nose of the mating coupler, locks pivoted adjacent the forward ends of each coupler nose with locking faces in abutment as pulling stresses are applied to said couplers, resilient means associated with each of said locks to retain it in normal locked position, and an operating arm extending through a wall and through said resilient means for pivotal engagement with said lock whereby said lock may be rotated to lock-set position, said lock-set lock having slidable cam engagement with the lock of the opposing coupler as said couplers are disengaged, whereby said lock-set is released and said lock-set lock returned to its normal unlocked position.

4. In an automatic coupler comprising a hollow head of funnel form having an integral tapering nose and an adjacent opening for the nose of a mating coupler, a lock pivoted in said nose and normally projecting into said opening for engagement with said mating coupler, an operating arm connected to said lock and extending through a wall of said head, a spring operable to retain said lock in normal position, said operating arm being movable to rotate said lock, engageable lock-set means on said arm and said wall, cam means underlying said arm in said head, said cam means affording a seat for said arm when said parts are in normal locked position, and affording abutment for anti-creep means on said arm.

5. In an automatic coupler comprising a hollow head of funnel form having an integral tapering nose and an adjacent opening, a lock pivoted in said nose and normally projecting into said opening for engagement with a mating coupler, an operating arm connected to said lock, a spring operable to retain said lock in normal position, said operating arm being movable to rotate said lock, engageable lock-set means on said arm and said wall, cam means underlying said arm in said head and projecting outwardly thereof for engagement with a mating coupler, said cam means affording a seat for said arm under certain operating conditions and affording lock-to-the-lock means by engagement with said arm in the uncoupling operation.

6. In a car coupling, mating coupler heads, each comprising a housing presenting at the forward end thereof projecting means and an opening receiving the projecting means of the mating coupler, locks pivoted in said projecting means and having abutment with each other to retain said couplers in normal locked position, resilient means operable to urge said locks into tight engagement with each other, anti-creep means preventing accidental disengagement of said lock in case of failure of said resilient means, each of said anti-creep means comprising an operating arm having abutment at one end with the associated lock and abutment with a cam member, said cam member being supported in one coupler head and retained in position by means on the opposing coupler.

7. In a tight lock coupler, a head in the form of a housing presenting a tapered nose at one side of the forward end and an opening at the other side thereof for reception of the nose of a mating coupler, a lock pivoted adjacent the forward end of said nose and extending into said opening for engagement with a mating lock in coupling, resilient means retaining said lock in said position, means for compressing said resilient means and withdrawing said lock from said opening to lock-set position, said last-mentioned means comprising an operating arm extending through said resilient means and engaging said lock, and means on said operating arm engaging means on a wall of said coupler to retain said lock in lock-set position.

8. In an automatic coupling, mated coupler heads, each in the form of a housing presenting adjacent its forward end a peripheral flange for abutment with the mating coupler, a tapering nose on each coupler head projecting beyond said flange, an opening receiving the tapered nose of the mating coupler, locks pivoted adjacent the forward ends of said noses with locking faces engaging each other when said couplers are in normal pulling position, resilient means extending laterally between each lock and a wall of the respective housing for retaining said locks in normal locked position, and an operating arm extending through said resilient means and outwardly of the coupler head for manual movement of said lock.

9. In a coupler, a head in the form of a housing presenting a tapered nose at one side of the forward end for vertically and laterally aligning said head with a mating coupler and an opening at the other side thereof for reception of the nose of the mating coupler, a lock pivoted adjacent the forward end of said nose and extending into said opening for engagement with the lock of a mating coupler in the normal coupling operation, resilient means compressed between said lock and a lateral wall of said housing for retaining said lock in said position, and means for compressing said resilient means and withdrawing said lock from said opening to lock-set position, said last-mentioned means comprising an operating arm extending laterally of said coupler head and through said resilient means for connection with said lock.

10. In an automatic coupler comprising a hollow head of funnel form having an integral tapering nose and an adjacent opening, a lock pivoted in said nose and normally projecting into said opening for engagement with a mating coupler, an operating arm pivoted to said lock and extending through a wall of said head, a spring operable to retain said lock in normal position, said operating arm being movable to rotate said lock, engageable lock-set means on said arm and said wall, cam means underlying said arm in said head and projecting outwardly thereof for engagement with a mating coupler, said cam means affording positioning means for said arm when said parts are in normal locked position.

11. In an automatic coupler comprising a hollow head of funnel form presenting a tapering nose, an opening laterally thereof for reception of a mating nose, a lock pivoted in said nose and normally projecting into said opening for engagement with a mating coupler, an operating arm pivoted to said lock and extending through a wall of said head, a spring surrounding said arm and operable to retain said lock in normal position, said operating arm being movable to rotate said lock, engageable lock-set means on said arm and said wall, and cam means underlying said arm in said head and projecting outwardly thereof for engagement with a mating coupler.

12. In a nonarticulating coupler, a head in the form of a housing presenting a tapered nose at one side of the forward end for aligning said head with a mating coupler and an opening at the other side thereof for reception of the nose of the mating coupler, a lock pivoted adjacent the forward end of said nose and extending into said opening for locking engagement with the lock of the mating coupler in the normal coupling operation, resilient means compressed between said lock and a lateral wall of said housing for retaining said lock in said position, and an operating arm for compressing said resilient means and withdrawing said lock from said opening to lock-set position within the contour of said coupler head, said arm extending laterally of said coupler head and through said resilient means for connection with said lock.

13. In an automatic tight lock vehicle coupling, mated coupler heads each comprising a housing with a tapering nose affording a maximum coupling range and an opening for reception of the nose of the mating coupler, locks pivoted adjacent the forward ends of said couplers with locking faces engaging each other for abutment as pulling stresses are applied to said couplers, resilient means compressed between each lock and a lateral wall of the associated housing to retain said lock in normal locked position, and an operating arm extending through said resilent means for connection to said lock whereby said lock may be rotated to lock-set position.

14. In an automatic nonarticulating car coupling, mated coupler heads in the form of housings, each of said heads having at the forward end a tapering nose affording a maximum coupling gathering range and an opening at one side of said nose receiving the tapering nose of the mating coupler, means on each of said heads at the extremity of said opening and the base of said nose affording abutment with means on the mating coupler, and locks pivoted in said noses adjacent the projecting ends thereof, said locks having abutment at their opposite ends along ogee locking faces angularly disposed with respect to the axis of said coupler.

15. In a car coupling, mating coupler heads, each comprising a housing presenting at the forward end thereof projecting means and an opening receiving the projecting means for the mating coupler, locks pivoted in said projecting means and extending into said openings for abutment with each other to retain said couplers in normal locked position, resilient means operable to urge said locks into tight engagement with each other, and anti-creep means within said housing preventing accidental disengagement of said locks in case of failure of said resilient means.

16. In an automatic coupler comprising a hollow head of funnel form having an integral tapering nose at one side thereof and an opening adjacent said nose, a lock pivoted in said nose and normally projecting into said opening for engagement with a mating coupler, stop means on said mating coupler for said lock, an operating arm pivoted to said lock and extending through a wall of said head, a spring surrounding said arm and operable to retain said lock in normal position, said operating arm being movable to rotate said lock, and engageable lock-set means on said arm and said wall.

17. In an automatic tight lock vehicle coupling, mated coupler heads each comprising a housing with a tapering nose and an opening for reception of the nose of the mating coupler, locks pivoted adjacent the forward ends of each coupler nose and having ogee locking faces engaging each other for abutment as pulling stresses are applied to said couplers, said locks forming a substantially rigid column extending between opposed walls of said couplers in normal pulling position.

18. In a car coupling, mating coupler heads, each presenting at the forward end thereof projecting means and an opening receiving the projecting means of the mating coupler, locks pivoted in said projecting means and extending outwardly thereof for abutment with each other to retain said couplers in normal locked position, operating means for said locks, and anti-creep means for each lock comprising a member pivoted on one coupler head and positioned in abutment with means on said operating means by engagement with the other coupler head.

19. In a tight lock car coupling, mating coupler heads, each presenting at the forward end thereof projecting means for aligning said heads and an opening receiving the projecting means of the mating coupler, locks pivoted in said projecting means and extending rearwardly thereof for abutment with each other to retain said couplers in normal locked position, and operable means for urging said locks into said abutment, said abutment being along surfaces of ogee shape.

20. In a car coupling, mating coupler heads, each presenting at the forward end thereof projecting means and an opening receiving the projecting means of the mating coupler, locks pivoted in said projecting means and extending rearwardly thereof for abutment with each other to retain said couplers in normal locked position, resilient means associated with each of said locks and operable to urge said locks into tight engagement with each other, and stop means within each head limiting rotation of the lock of the mating coupler.

21. In an automatic vehicle coupling, mated coupler heads, each comprising a housing with a tapering nose projecting at one side thereof and an opening at the opposite side thereof for reception of the nose of the mating coupler, locks pivoted adjacent the forward ends of each coupler nose and with locking faces engaging each other for abutment as pulling stresses are applied to said couplers, and stop means on said housing abutting the lock of the mating coupler.

22. In a coupler, a head in the form of a housing presenting a tapered nose and an adjacent opening for reception of the nose of a mating coupler, a lock pivoted adjacent the forward end of said nose and extending into said opening for locking engagement with the lock of said mating coupler in the normal coupling operation, and stop means on said housing engaging the lock of the mating coupler.

23. In an automatic coupling, mated coupler heads each in the form of a housing presenting a tapered nose and an adjacent opening for reception of the nose of a mating coupler, said opening having beveled edges therearound, a lock pivoted adjacent the forward end of said nose and extending into said opening for locking engagement with the lock of said mating coupler, lock operating means, and anti-creep means comprising a cam member movable into and out of engagement with said operating means by engagement with certain of said beveled surfaces on the mating coupler.

24. In a tight lock car coupling, mating coupler heads, each presenting at the forward end thereof projecting means for vertically and laterally guiding said heads into alignment and an opening receiving the projecting means of the mating coupler, locks pivoted in said projecting means and extending outwardly thereof formed and arranged for tight ogee face engagement with each other to retain said couplers in normal locked position.

25. In a car coupling, mating coupler heads each presenting a lock for abutment with the lock of the mating coupler, operating means for said locks, and anti-creep means for each of said locks comprising a member pivoted in one coupler and positioned in abutment with means on said operating means by engagement with the other.

26. In a car coupling, mating coupler heads each presenting a lock for abutment with the lock of the mating coupler, lock operating means, and anti-creep means automatically operative when said couplers are coupled and automatically released as said couplers are uncoupled, said anti-creep means comprising a member movable into and out of engagement with said operating means by cam engagement with the mating coupler.

27. In a car coupling, mating coupler heads each presenting a lock for abutment with the lock of the mating coupler, lock operating means, and anti-creep means on said couplers automatically releasable by the uncoupling operation, said anti-creep means including a member movable out of engagement with said operating means as said member disengages with said mating coupler.

28. In a car coupling, mating coupler heads each presenting a lock for abutment with the lock of the mating coupler, lock operating means, and anti-creep means automatically operative when said couplers are coupled, said anti-creep means including a member movable into engagement with said operating means by cam engagement with said mating coupler.

29. In a car coupling, mated coupler heads each in the form of a housing presenting at the forward end thereof projecting means and an opening adjacent said means with wedging surfaces therearound, a lock pivoted adjacent the forward end of said means extending into said opening and formed and arranged for tight ogee face engagement with the lock of a mating coupler, and stop means on said housing engaging the lock of said mating coupler.

30. In a car coupling, mated coupler heads each comprising a housing with a flange extending entirely therearound, gathering means for vertically and laterally bringing each of said couplers into alignment with the mating coupler, said means comprising a pyramidal member extending outward from said surface and an adjacent opening with wedging surfaces therearound, a lock pivoted adjacent the forward end of said pyramidal member and extending into said opening for engagement with the lock of the mating coupler during coupling, operating means for each of said locks, and anti-creep means for each of said locks comprising a cam member movable into and out of engagement with said operating means by engagement with the mating coupler.

31. In a car coupling, a coupler comprising a housing presenting a buffing surface extending entirely therearound and lying in a plane at right angles to the axis of said coupler, means on said coupler affording maximum vertical and lateral coupling gathering range and comprising a pyramidal nose extending outward from said surface and an adjacent opening with wedge means therearound, interlocking means maintaining said buffing surface in tight engagement with a buffing surface on a mating coupler, a lock pivoted adjacent the forward end of said nose and extending into said opening for locking engagement with the lock of said mating coupler in a normal coupling operation, and stop means on said housing engaging the lock of the mating coupler.

32. In a car coupling, a coupler head in the form of a housing presenting an aligning member and an opening adapted to receive the aligning member on the mating coupler head, a lock pivoted in said housing, operable means associated with said lock, and pivoted cam means within said housing adapted to engage the mating coupler head during coupling and to cooperate with said operable means to afford a lock to the lock.

33. In a car coupling, a coupler head in the form of a housing presenting an aligning member and an opening adapted to receive the aligning member on the mating coupler head, a lock pivoted in said aligning member, operating means for said lock, and pivoted means adapted for cam engagement with the mating coupler head during coupling and movable thereby into engagement with said operating means to afford a lock to the lock.

34. In a coupler, a head in the form of a housing presenting at the forward end thereof projecting means and an opening receiving the projecting means of a mating coupler, a lock pivoted in said projecting means and extending into said opening for abutment with the lock of the mating coupler, resilient means extending between said lock and a wall of said housing, an operating member connected to said lock, and means on said head adapted to cooperate at times with means on said operating member and the mating coupler for holding said lock in lockset position for an uncoupling operation, said lock cooperating with the lock on said mating coupler to automatically disengage the means on said head and the means on said operating member.

35. In a coupler, a head in the form of a housing presenting at the forward end thereof projecting means and an opening receiving the projecting means of a mating coupler, a lock pivoted in said projecting means and extending into said opening for abutment with the lock of the mating coupler, resilient means extending between said lock and a wall of said housing, an operating member connected to said lock, and means in said head cooperating with the mating coupler adapted for engagement with said operating member to afford a lockset for an uncoupling operation and automatically disengageable during separation of the couplers.

EDMUND P. KINNE.